US005978004A

United States Patent [19]

Ehrhardt

[11] Patent Number: 5,978,004

[45] Date of Patent: Nov. 2, 1999

[54] LABEL PRINTER WITH LABEL EDGE SENSOR

[75] Inventor: Robert A. Ehrhardt, Palatine, Ill.

[73] Assignee: Zebra Technologies Corporation, Vernon Hills, Ill.

[21] Appl. No.: 08/829,356

[22] Filed: Mar. 31, 1997

[51] Int. Cl.[6] .......... G01D 15/00

[52] U.S. Cl. .......... 347/171; 400/583.3; 101/288

[58] Field of Search .......... 347/171, 177, 347/222; 400/707, 708, 583.3; 310/329; 101/288

[56] References Cited

U.S. PATENT DOCUMENTS

| | | | |
|---|---|---|---|
| 3,425,346 | 2/1969 | Voight et al. | 101/292 |
| 3,493,457 | 2/1970 | Jugler | 156/580.1 |
| 3,889,111 | 6/1975 | Moss | 250/548 |
| 3,997,780 | 12/1976 | Waehner | 250/223 R |
| 4,019,619 | 4/1977 | Emenaker | 197/133 R |
| 4,074,130 | 2/1978 | Messman et al. | 356/198 |
| 4,121,716 | 10/1978 | Luperti et al. | 209/82 |
| 4,132,583 | 1/1979 | Hodgson | 156/351 |
| 4,375,190 | 3/1983 | Quinci et al. | 101/174 |
| 4,420,747 | 12/1983 | Kistner | 340/674 |
| 4,470,349 | 9/1984 | Godlewski | 101/233 |
| 4,544,287 | 10/1985 | Teraoka | 101/27 |
| 4,699,531 | 10/1987 | Ulinski, Sr. et al. | 400/120 |
| 4,795,281 | 1/1989 | Ulinski, Sr. et al. | 400/120 |
| 4,844,629 | 7/1989 | Hoyt | 400/583.3 |
| 4,905,590 | 3/1990 | Nobile | 101/91 |
| 4,953,994 | 9/1990 | Shiozaki et al. | 400/120 |
| 4,997,508 | 3/1991 | Shinno et al. | 156/351 |
| 5,000,812 | 3/1991 | Murphy | 156/268 |
| 5,002,410 | 3/1991 | Yajima | 400/88 |
| 5,010,766 | 4/1991 | Typpo | 73/159 |
| 5,064,300 | 11/1991 | Kashiwaba | 400/120 R |
| 5,069,562 | 12/1991 | Matsuda | 400/120 |
| 5,087,925 | 2/1992 | No et al. | 347/177 |
| 5,118,209 | 6/1992 | Bennet et al. | 400/56 |
| 5,136,144 | 8/1992 | Swinton et al. | 235/379 |
| 5,150,130 | 9/1992 | Sato | 347/222 |
| 5,188,028 | 2/1993 | Reichel | 101/228 |
| 5,193,918 | 3/1993 | Lohrmann et al. | 400/56 |
| 5,204,537 | 4/1993 | Bennet et al. | 250/560 |
| 5,266,967 | 11/1993 | Maslanka et al. | 347/178 |
| 5,401,352 | 3/1995 | Matsushita et al. | 156/384 |
| 5,437,228 | 8/1995 | Uland | 101/288 |
| 5,438,349 | 8/1995 | Fox et al. | 346/136 |
| 5,486,063 | 1/1996 | Fox et al. | 400/708 |
| 5,507,583 | 4/1996 | Beaty et al. | 400/611 |
| 5,521,627 | 5/1996 | Keung et al. | 347/171 |
| 5,523,644 | 6/1996 | Witehira | 310/329 |
| 5,524,996 | 6/1996 | Carpenter et al. | 101/288 |
| 5,564,846 | 10/1996 | Katsumata | 400/611 |

*Primary Examiner*—N. Le
*Assistant Examiner*—Anh T. N. Vo
*Attorney, Agent, or Firm*—Emrich & Dithmar

[57] ABSTRACT

A label printer includes a thermal print head assembly for printing pressure sensitive adhesive-backed labels spaced longitudinally on a web. The print head assembly includes a row of heater elements aligned transversely of the web path and movable toward and away from the web, the heater elements being biased against the web. Mechanical displacement of the print head assembly due to the passage of the leading and trailing edges of the labels beneath the heater elements is sensed by a piezoelectric sensor carried by the print head assembly to locate the printing on the labels with respect to the edges. The sensor may be mounted directly on a pivoting print head or may be mounted on a pivoting support or bracket which carries the print head. The print head assembly may be of the thermal printing or thermal transfer printing type. Both individual and stacked piezoelectric ceramic transducer elements are disclosed.

21 Claims, 3 Drawing Sheets

LABEL PRINTER WITH LABEL EDGE SENSOR

BACKGROUND OF THE INVENTION

1. Field of the Invention

The present invention relates to thermal and thermal transfer label printers and, more specifically, to such printers adapted to printing on pressure sensitive adhesive-backed labels.

2. Description of the Prior Art

Thermal and thermal transfer printers are well known in the art. In thermal label printers, a web of pressure sensitive adhesive-backed labels, each having a thermally sensitized surface, is fed between a platen roller and a thermal print head. In a thermal transfer label printer, a transfer ribbon having a heat transferrable ink layer is additionally interposed between the print head and the label so that non-sensitized labels may be printed. The transfer ribbon is flexible and typically no thicker than ten microns. Thus, the principles of the present invention are equally applicable to thermal and thermal transfer printers.

Pressure sensitive adhesive-backed labels for automated printing are typically presented in a continuous web. The web consists of a backing sheet of wax or silicone-impregnated paper approximately 0.0015" thick and having multiple labels of paper, polyester, synthetic paper, or similar material having a thickness between 0.0015" and 0.010" removably mounted thereon with a rubber or acrylic pressure-sensitive adhesive. Successive labels are separated by an interlabel gap, typically 0.125" wide, to which the printer is responsive for alignment of printing on the label. The web may be supplied from a roll or from a fanfold.

It is preferable to friction feed the web by driving the platen roller so as to avoid tractor holes in the web which result in increased waste. In a friction fed thermal printer, deformation of the platen roller and slippage between the backing material and the platen introduce variability in the feed distance of the web per increment of platen shaft motion. Slippage is a function of the web tension and produces a net loss in web advance when the printer advances a label against supply roll inertia to facilitate removal after printing and then backfeeds into a slack web before printing the next label.

The error in web advance accumulates as successive labels are printed, resulting in progressive misregistration of the label image with respect to the label edges. A friction fed printer thus requires some means of sensing the edge of each label for synchronization in order to print multiple labels without manual intervention.

Label location in typical prior art thermal printers has been accomplished by measuring the optical transmissivity of the web. The backing is illuminated by a light source of known intensity, typically an infrared light-emitting diode. The amount of light passing through the backing between labels is greater than the light passing through the laminated backing and label. The transmitted light illuminates a photocell, which converts the changes in transmitted light to a varying electrical signal. The electrical signal can then be measured and interpreted as the label edge location by the printer's logic circuits and used to synchronize printing of each label.

The optical sensor just described has inherent limitations. Even though the intensity of the light source is constant, the paper fibers in the label and in the backing produce fluctuations in the light intensity which introduce error in the edge determination. Additionally, transverse movement of the slack web perpendicular to its plane between the light source and the photocell occurs during backfeed, which introduces an additional error.

The optical sensor is typically located an inch or more away from the heater elements to avoid mechanical interference with the print head or platen. If the web slips between the time the leading edge of a label passes the photocell and when it reaches the heater elements, or if slack develops between the photocell and the heater elements during backfeed, the printing will be misregistered on the label.

SUMMARY OF THE INVENTION

It is a general object of the invention to provide an improved label printer which avoids the disadvantages of prior printers while affording additional structural and operating advantages.

An important feature of the invention is to sense directly when a label edge reaches the heater elements of the print head.

In connection with the foregoing feature, it is a further feature of the invention to reduce the error in locating a label edge in the presence of feed rate variations and slack in the web.

In connection with these features, a further feature of the invention is the provision of a label edge sensor mounted or carried by the print head assembly for movement therewith.

These and other features of the invention are attained by providing a label printer for printing on labels spaced longitudinally along a carrier web with each label having a predetermined thickness and a leading edge and a trailing edge, the printer comprising: driving mechanism for advancing the web along a path, a thermal print head assembly mounted for movement toward and away from the web and including a line of heater elements aligned transverse to the direction of travel of the web, a bias mechanism urging the print head toward the web so that the heater elements are pressed against the web, a motion sensor carried by the print head assembly for sensing displacement of the print head assembly due to the passages of the edges of the labels beneath the heater elements, and a controller responsive to the motion sensor for synchronizing printing with the edges of each label.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENTS

Figure 1:
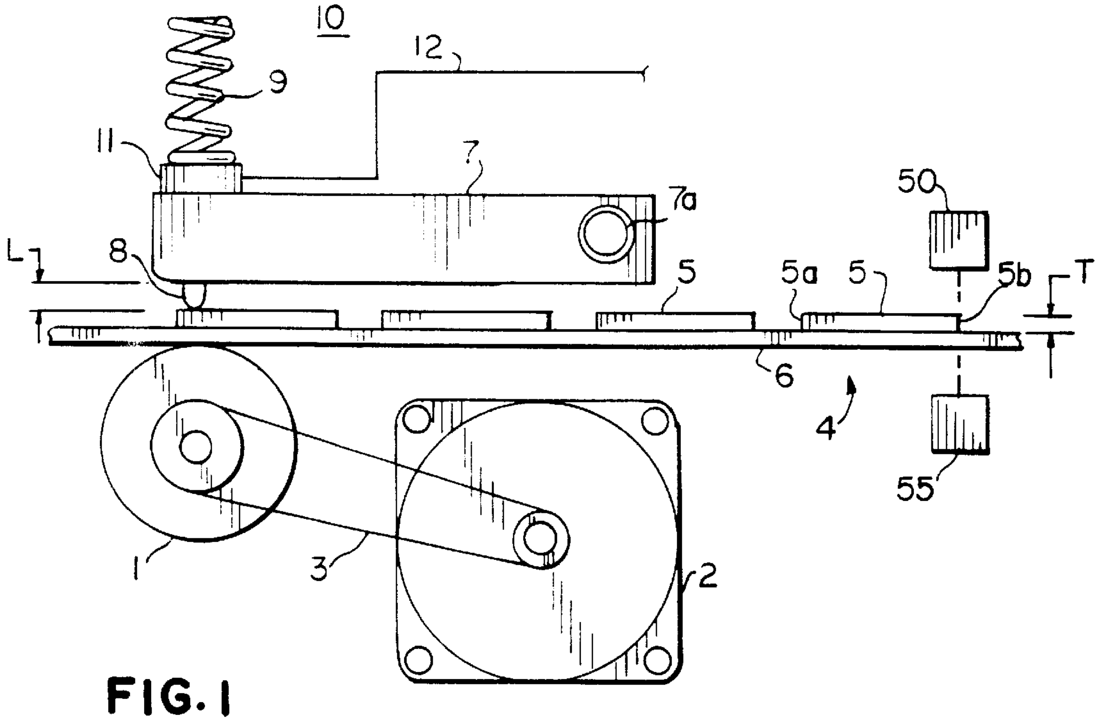
FIG. 1 is a side elevational view of a portion of a thermal printer including a first embodiment of the label edge sensor of the present invention.

A thermal printer 10 adapted for printing labels is shown in FIG. 1. A driving mechanism includes a platen roller 1, driven by a stepper motor 2 through belt and pulley drive 3 to advance a label web 4 having a plurality of rectangular labels 5 removably positioned on a backing 6. A print head assembly includes a thermal print head 7 of a prior art type having a line of heater elements 8 is positioned by a pivot 7*a* such that heater elements 8 are aligned transverse to the motion of web 4. Heater elements 8 are pressed against web 4 and web 4 against platen 1 by the action of a bias mechanism, such as a spring 9, through a motion sensor, preferably in the nature of a pressure transducer 11, having an electrical output lead 12. While print head 7 is shown as directly pivoted, it may be carried by a pivoted support bracket, and the transducer 11 could be disposed at the junction between such a bracket and the print head 7.

Each of the heater elements 8 has a dome-shaped tip and is of finite length L, the elements 8 forming a line of contact across web 4. Print head 7 is thus displaced mechanically by the thickness T of labels 5 when the leading edge 5*a* or trailing edge 5*b* of each of labels 5 passes under the heater elements 8.

The upward displacement at each leading edge 5*a* against spring 9 through pressure transducer 11 produces an increase in electrical output on lead 12. Similarly, the downward displacement at each trailing edge 5*b* results in a decrease in electrical output on lead 12.

Figure 2:
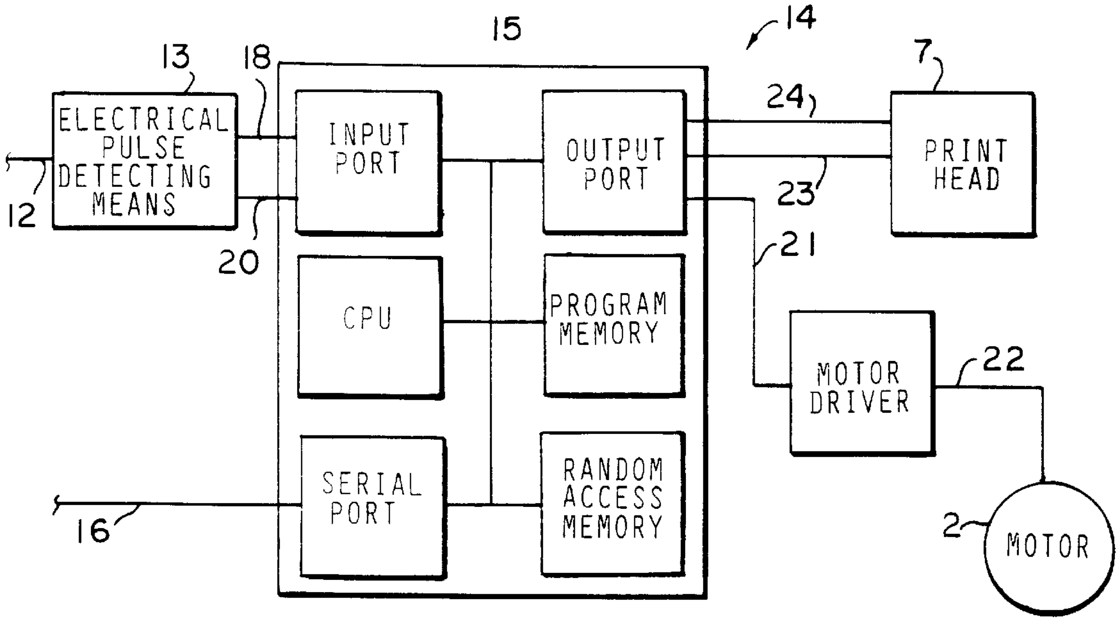
FIG. 2 is a partially schematic and partially functional block diagram of microprocessor-based controller for the printer of FIG. 1.

FIG. 2 is a diagram of a controller 14 for the printer 10. Controller 14 includes a single-chip microprocessor 15 having internal program memory, random access memory, a serial port responsive to a serial data input 16 for the receipt of information to be printed on a label, and input and output ports interconnected and operating in a manner well known in the art.

Controller 14 further includes a suitable electrical pulse detecting circuit 13 for receiving the sensor output signal on lead 12. The circuit 13 generates a first output on line 18 in response to the increase in the signal on lead 12 when the leading edge 5*a* of label 5 passes under the heater elements 8. In a similar fashion, the negative pulse or change on sensor output lead 12 causes the circuit 13 to generate a second output on line 20 when the trailing edge 5*b* of label 5 passes under the heater elements 8.

When a signal is received at serial data input 16 calling for a label to be printed, controller 14 begins pulsing line 21 to motor driver 22 in order to advance stepper motor 2 until the label edge signal 18 from circuit 13 is asserted. Microprocessor 15 then loads into print head 7 data 23 representing the heaters to be energized and energizes the selected heaters by pulsing strobe 24 to print the first row of dots. It then pulses line 21 to driver 22 again to advance web stepping motor 2 by one dot row and then repeats the printing process. This process continues until the second label edge signal 20 from circuit 13 is asserted, signalling the end of the label, at which time controller 14 ceases printing and awaits the request for the next label.

The pressure transducer 11 could be of any of a number of different types, but is preferably a piezoelectric transducer. Piezoelectric transducers formed of any of a number of different materials could be used, but the presently preferred material is a suitable piezoelectric ceramic material, such as a lead zirconate titanate material of the type sold by Morgan Matroc, Inc. under the designation PZT-5A. Piezoelectric transducers are available in any of a number of different physical configurations. The transducer 11 illustrated in FIG. 1 is in the nature of a single disk-like or annular transducer element, although it will be appreciated that the transducer element could be formed of any of number of different sizes and shapes.

Figure 3:
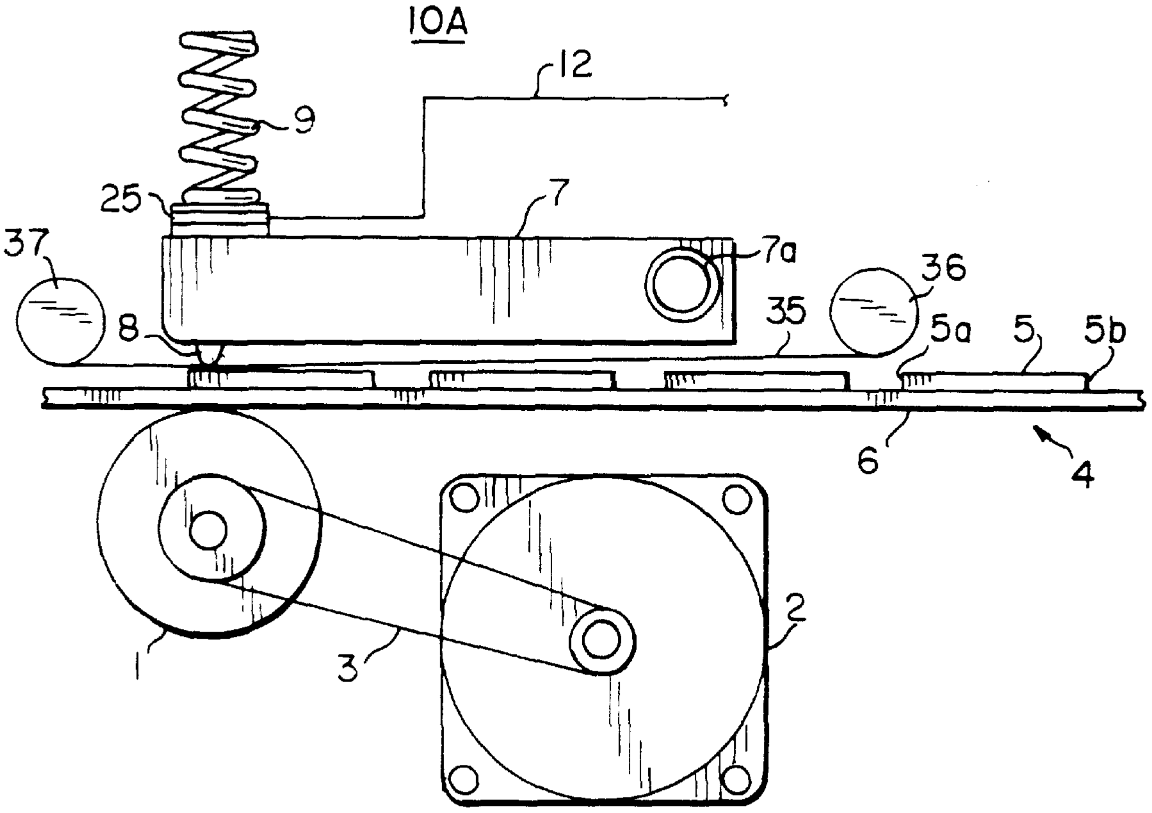
FIG. 3 is a view similar to FIG. 1 of a thermal transfer printer incorporating another embodiment of the sensor of the present invention.
Figure 4:
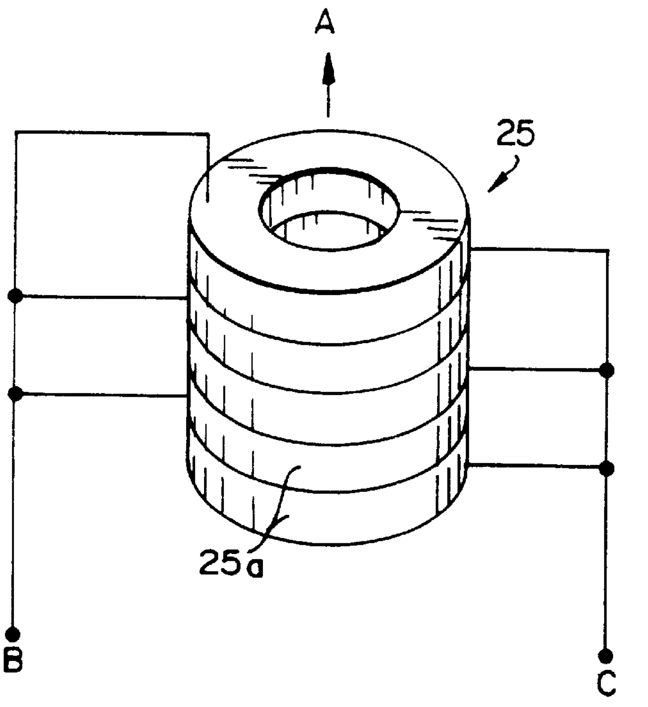
FIG. 4 is a perspective view of a sensor incorporating a stack of piezoelectric transducers connected mechanically in series and electrically in parallel in accordance with an embodiment of the invention.

Referring now to FIG. 3, there is illustrated a thermal transfer printer 10A, which is substantially similar to the printer 10 of FIGS. 1 and 2. However, in this case, in order to boost signal amplitude, the motion sensor is in the nature of a piezo stack 25, which may be a plurality of annular piezoelectric transducer elements 25*a* arranged mechanically in series and electrically in parallel, as illustrated in FIG. 4, although it will be appreciated that other arrangements of plural elements could be used. Preferably, the transducer elements 25*a* have their respective electrical and mechanical axes aligned in the same direction, as indicated by the arrow A. The displacement of each transducer element 25*a* along axis A adds to the total displacement of the stack 25 and, likewise, the displacement of the entire stack 25 is equal to the sum of the individual displacements. When mechanical pressure is applied to the stack 25 along axis A, each transducer element 25*a* in the stack products a voltage proportional to the mechanical pressure applied and these voltages are then summed together, forming a larger voltage across terminals B and C. Thus, the upward displacement at leading edge 5*a* against spring 9 through the piezo stack 25 produces pressure thereon, forming a positive electrical voltage pulse. Similarly, the downward displacement at each trailing edge 5*b* results in a negative electrical voltage pulse. The controller 14 of FIG. 2 may be used with the print head 10A of FIG. 3, and operates in the same manner described above.

The discussion of the embodiment of FIG. 1, above, is in the context of a thermal printer, wherein the heater elements 8 directly contact the face of the label 5, which accordingly has a suitable thermally sensitive coating thereon in a known manner. However, it will be appreciated that the principles of the invention are equally applicable to thermal transfer printers, such as the printer 10A. Thus, there is illustrated in FIG. 3, a thermal transfer ribbon 35 which is disposed between the heater elements 8 and the labels 5, being fed in the direction of web movement from a supply roll 36 to a take-up roll 37, in a known manner.

Figure 5:
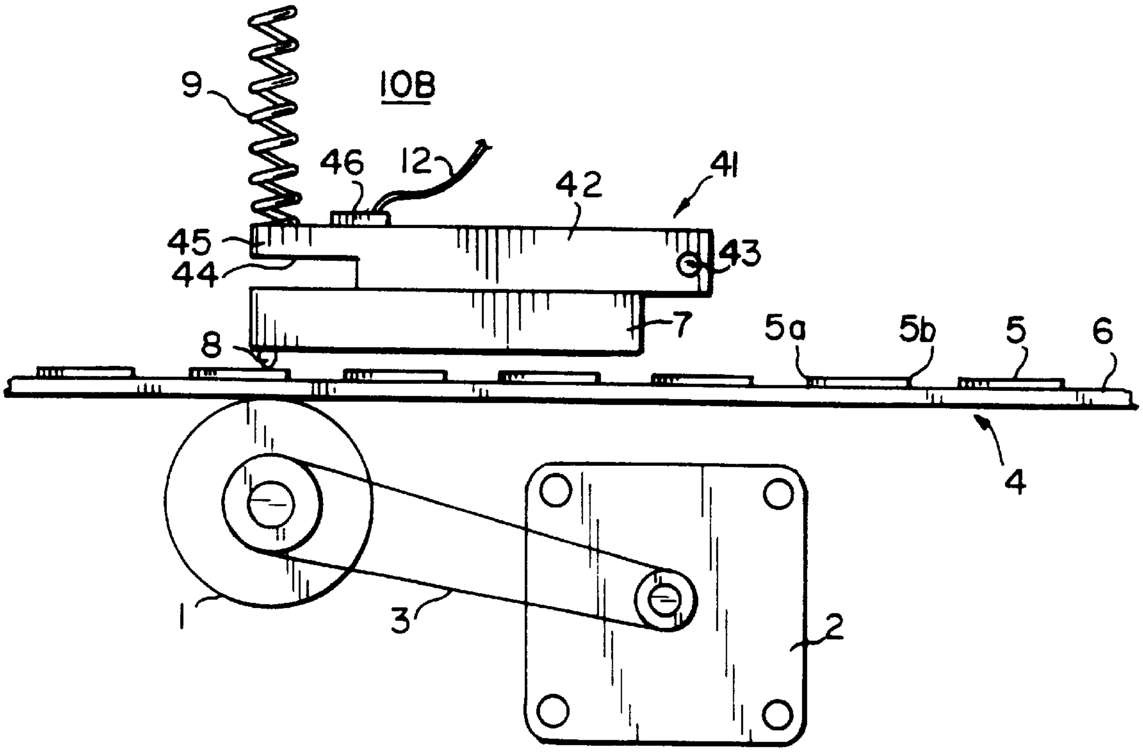
FIG. 5 is a view similar to FIG. 1 of yet another embodiment of the edge sensor of the present invention.

In the embodiments of FIGS. 1 and 3, the print head 7 is directly pivotally mounted for movement toward and away from the web 4. Referring to FIG. 5, there is illustrated an alternative embodiment of a printer 10B, which is similar to the printer 10 of FIG. 1, except that it includes a print head assembly 40 having a print head support in the nature of a mounting bracket 41 including an elongated, rectangular body 42 pivotally mounted at one end thereof, as at 43, for movement toward and away from the web 4. The distal end of the body 42 is undercut, as at 44, to provide a projecting arm 45. The print head 7 is fixed to the underside of the body 42 forwardly of the pivot 43, so that the forward end of the print head 7 is co-terminuous with distal end of the arm 45. A motion sensor 46 is fixed to the support bracket 41 at the juncture between the arm 45 and the remainder of the body 42, while the spring 9 bears against the arm 45.

As is well known in the art, bending motions on thin piezoelectric elements produced a positive voltage when bent in a first direction and a negative voltage when bent in a second direction. Thus, the upward displacement of the print head assembly 40 at a leading label edge 5*a* against the spring 9 will cause a flexing of the arm 45 relative to the remainder of the print head assembly 40, which flexing movement is transmitted to the motion sensor 46 and produces a slight bending motion thereof, forming a positive electrical voltage pulse on the lead 12. Similarly, the downward displacement at each trailing edge 5*b* results in a negative electrical voltage pulse. It will be appreciated that the motion sensor 46 could be of any of the various types of motion sensors described above, and could be disposed at other locations on the print head assembly 40.

Furthermore, it will be appreciated that all of the foregoing embodiments could be utilized with a prior art type of optical medium sensor 50, 55 (FIG. 1) to detect a label-out condition, which might otherwise be difficult to detect with a motion sensor of the type described above.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A label printer for printing on labels spaced longitudinally along a carrier web with each label having a predetermined thickness and a leading edge and a trailing edge, said printer comprising:

driving mechanism for advancing the web along a path, a thermal print head assembly mounted for movement toward and away from the web and including a line of heater elements aligned transverse to the direction of travel of the web, a bias mechanism urging the print head toward the web so that the heater elements are pressed against the web, a motion sensor carried by the print head assembly for sensing displacement of the print head assembly due to passing of the edges of the labels beneath the heater elements, and a controller coupled to the motion sensor and to the print head assembly and responsive to the motion sensor for synchronizing printing with the edges of each label.

2. The label printer of claim 1, wherein each of the labels is removably attached to the carrier web by a pressure-sensitive adhesive.

3. The label printer of claim 1, wherein the print head assembly includes bias mechanism resiliently urging it toward the web, and each of the labels has a thermally sensitized surface engageable with said heater elements.

4. The label printer of claim 1, and further comprising a thermally activated ink transfer ribbon disposed between the heater elements and the web.

5. The label printer of claim 1, wherein said motion sensor is a piezoelectric sensor.

6. The label printer of claim 5, wherein said piezoelectric sensor is-formed of a ceramic material.

7. The label printer of claim 5, wherein said motion sensor includes a plurality of piezoelectric transducer elements.

8. The label printer of claim 7, wherein said motion sensor includes a stack of several piezoelectric transducer elements connected mechanically and electrically.

9. The label printer of claim 1, and further comprising support means for supporting the web adjacent to the thermal print head assembly.

10. The label printer of claim 1, and further comprising a carrier web sensor for detecting the absence of carrier web.

11. A label printer for printing on labels spaced longitudinally along a carrier web with each label having a predetermined thickness and a leading edge and a trailing edge, said printer comprising:

driving mechanism for advancing the web along a path, a print head support mounted for movement toward and away from the web, a thermal print head carried by said support for movement therewith and including a line of heater elements aligned transverse to the direction of travel of the web, a bias mechanism urging the print head support toward the web so that the heater elements are pressed against the web, a motion sensor carried by the support for sensing displacement of the print head assembly due to passing of the edges of the labels beneath the heater elements, and a controller coupled to the motion sensor and to the print head assembly and responsive to the motion sensor for synchronizing printing with the edges of each label.

12. The label printer of claim 11, wherein each of the labels is removably attached to the carrier web by a pressure-sensitive adhesive.

13. The label printer of claim 11, wherein the print head assembly includes bias mechanism resiliently urging it toward the web, and each of the labels has a thermally sensitized surface engageable with said heater elements.

14. The label printer of claim 11, wherein said motion sensor is a piezoelectric sensor.

15. The label sensor of claim 14, wherein said motion sensor includes a plurality of piezoelectric transducer elements.

16. The label printer of claim 15, wherein said motion sensor includes a stack of several piezoelectric transducers connected mechanically and electrically.

17. The label printer of claim 11, and further comprising a thermally activated ink transfer ribbon disposed between the heater elements and the web.

18. The label printer of claim 17, wherein said piezoelectric sensor is formed of a ceramic material.

19. The label printer of claim 11, and further comprising support means for supporting the web adjacent to the thermal print head assembly.

20. The label printer of claim 11, wherein said print head support includes a main body portion and an arm cantilevered from one end of said main body portion, said bias mechanism being engageable with said arm, said motion sensor being disposed at a juncture of said arm with said main body portion.

21. The label printer of claim 17, and further comprising a carrier web sensor for detecting the absence of carrier web.

* * * * *

UNITED STATES PATENT AND TRADEMARK OFFICE
CERTIFICATE OF CORRECTION

PATENT NO. : 5,978,004
DATED : November 2, 1999
INVENTOR(S) : Robert A. Ehrhardt It is certified that error appears in the above-identified patent and that said Letters Patent is hereby corrected as shown below:

ON THE TITLE PAGE:
Item

[56] "3425346 2/69 Voight et al." should be - - 3425346 2/64 Voight et al. - -;
column 5, claim 1, line 44 after "to" delete "the", insert - - a - -;
column 5, claim 1, line 48 after "sensor" delete "carried by", insert - - disposed on - -;
column 5, claim 3, line 59 after "includes", insert - - the - -;
column 6, claim 6, line 2 after "is" delete "-";
column 6, claim 10, line 13 after "detecting" delete "the", insert - - an - -, and after 'of' insert - - the - -;
column 6, claim 11, line 21 after "print head" delete "carried by", insert - - disposed on - - and after "said" insert - - print head- -;
column 6, claim 11, line 23 after "to" delete "the" and insert - - a - -;
column 6, claim 11, line 28 after "sensor" delete "carried by" insert - - formed on - - and after "the" insert - - print head - - ;
column 6, claim 21, line 64 after "claim" delete "17", insert - - 11 - -; and
column 6, claim 21, line 65 after "detecting" delete "the" insert - - an - - and after "of" insert - - the - -.

Signed and Sealed this
Twenty-ninth Day of August, 2000

Attest:

Q. TODD DICKINSON

*Attesting Officer*

*Director of Patents and Trademarks*